T. G. McQUEEN.
HAME CONNECTION.
APPLICATION FILED OCT. 24, 1917.

1,260,225.

Patented Mar. 19, 1918.

T. G. McQueen
Inventor

By Geo. P. Kimmel
Attorney

UNITED STATES PATENT OFFICE.

THEODORE G. McQUEEN, OF SWAN CREEK, ILLINOIS.

HAME CONNECTION.

1,260,225.  Specification of Letters Patent.  Patented Mar. 19, 1918.

Application filed October 24, 1917. Serial No. 198,349.

*To all whom it may concern:*

Be it known that I, THEODORE G. McQUEEN, a citizen of the United States, residing at Swan Creek, in the county of Warren and State of Illinois, have invented certain new and useful Improvements in Hame Connections, of which the following is a specification.

This invention relates to harness and the invention has more especial reference to an improved hame connection.

The invention has for its dominant object to provide a connection whereby the hames when in position upon a horse will be positively and yieldably connected and will be permitted to automatically adjust themselves to the collar about the neck of the horse, thereby insuring the proper application of the load to the animal's shoulders.

Another and equally important object of the invention is to provide an adjustable hame connection, whereby the same can be used upon collars varying in size.

The improvements in the details and arrangement of parts will be apparent from an inspection of the accompanying drawings, in connection with the specific description hereinafter contained, and wherein the preferred embodiment of the invention is disclosed for the purpose of imparting a full understanding of the same.

In the drawings:—

Figure 1:
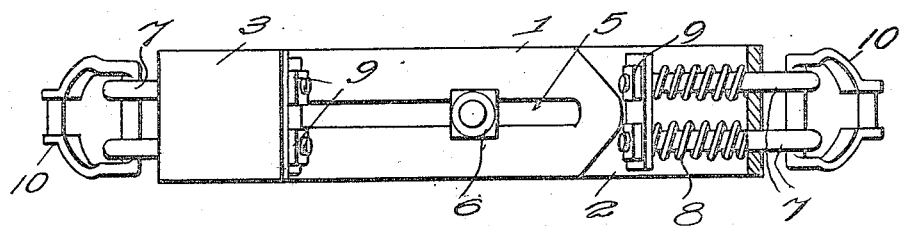
Figure 1 is a top view of the connection partly in section.
Figure 2:
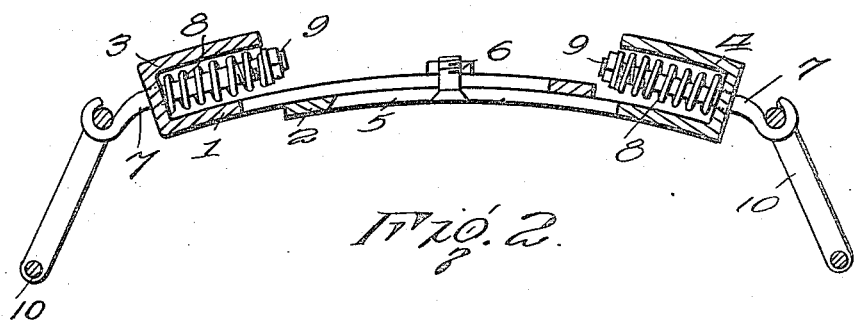
Fig. 2 is a vertical longitudinal section.
Figure 3:
Fig. 3 is a vertical transverse section therethrough.

Referring more specifically to the drawings, wherein like reference characters designate corresponding parts in the several views, 1 and 2 represent the base plates of the connection, the opposite ends of which are bent upon themselves to provide hooked portions 3 and 4. Longitudinally extending slots 5 are formed in the body portions of the base plates 1 and 2, which as will be noted, are curved, and serve as means for permitting the passage of a bolt 6 therethrough in order that the base plates may be locked in adjusted positions; it of course being understood in this connection, that the longitudinally deposed slots are alined in order that the bolt 6 may be passed through the plates 1 and 2.

Passing through suitable openings formed in the hooked portions 3 and 4 are eye-bolts 7 having coil springs 8 arranged about the inner portions o fthe shanks thereof and bearing on nuts 9 arranged on said shank portions and the adjacent portions of the hook 3 and 4.

Stirrups or lin k10 are adapted to be engaged with the bolts 7 and as will be understood, have connection with the hames arranged upon the sides of the harness collar.

When using the improved hame connection, the strirrups 10 are engaged with the bolt 7 subsequent to the adjustment of the curved base plates 1 and 2. Due to the engagement of the bolts 7 with the hooked portions 3 and 4 of the base plates it will be readily understood that the hames will be yieldably connected and as a consequence, will be permitted to automatically adjust themselves to the harness collar, thereby causing the load or pull to be properly applied to the shoulders of the horse. By adjusting the curved base plates 1 and 2 the hame connection may be adapted for use on collars varying in size.

Manifestly, the construction shown is capable of considerable modification and such modification as is within the scope of my claims, I consider within the spirit of my invention.

I claim:—

1. A hame connection including an adjustable base, and hooks yieldably engaged with the opposite extremities of said base.

2. A hame connection including a base having its opposite extremities provided with hooked portions, bolts passing through openings formed in said hooked portions, and spring means engaged with the bolts and the hooked portions.

3. A hame connection including complemental base plates, means for adjustably connecting said base plates, and hooks yieldably engaged with the opposite extremities of said plates.

4. A hame connection including curved complemental base plates, means for adjustably connecting said base plates, the opposite extremities of the plates being provided with hooked portions, bolts passing through openings formed in the hooked portions, and resilient means engaged with the bolts and said hooked portions.

In testimony whereof, I affix my signature hereto.

THEODORE G. McQUEEN.